United States Patent [19]

Wedek et al.

[11] 4,361,405

[45] Nov. 30, 1982

[54] METHOD AND APPARATUS FOR PREPARING, MORE PARTICULARLY FOR THE COOLING AND MIXING OF MOULDING SAND

[75] Inventors: Rolf Wedek, Alfeld; Lothar Meiritz, Sarstedt, both of Fed. Rep. of Germany

[73] Assignee: Alfelder Maschinen-Und Modell-Fabrik Kunkel, Wagner & Co. K.G., Fed. Rep. of Germany

[21] Appl. No.: 217,591

[22] Filed: Dec. 18, 1980

[51] Int. Cl.³ .......................... B28C 5/46; B01F 13/06
[52] U.S. Cl. ......................................... 366/7; 366/139
[58] Field of Search ............... 366/7, 4, 10, 12, 40, 366/72, 96, 97, 139, 144, 145, 163, 167, 168, 191, 341

[56] References Cited

U.S. PATENT DOCUMENTS

| | | | |
|---|---|---|---|
| 1,673,085 | 6/1928 | Loomis | 366/139 |
| 2,264,610 | 12/1941 | Beardsley | 366/4 |
| 2,593,327 | 4/1952 | McIlvanie | 366/139 |
| 3,108,448 | 10/1963 | Hightower | 366/7 X |

Primary Examiner—Edward J. McCarthy
Attorney, Agent, or Firm—Barnes, Kisselle, Raisch, Choate, Whittemore & Hulbert

[57] ABSTRACT

Method and apparatus for the preparation, more particularly for the cooling and mixing of moulding sand. The method includes the steps of cooling used sand, cleaning the sand where appropriate, and mixing and homogenizing the sand by the addition of water accompanied by intensive agitation, and partly covering the particle surface of the sand with a binding agent under vacuum. The structure for performing the method includes at least one cooling station and one mixing station wherein mixing is associated with a vessel for receiving and with apparatus for supplying constituents to be mixed, and with an agitating device, a device for supplying water, and a device for removing the finished sand mixture, which structure is characterized in that the vessel can be hermetically sealed or is disposed in a hermetically sealed casing and that a vacuum chamber is provided with apparatus for generating a vacuum and at least one flow connection that can be controlled by a controllable valve device is provided between the vessel and vacuum chamber.

22 Claims, 1 Drawing Figure

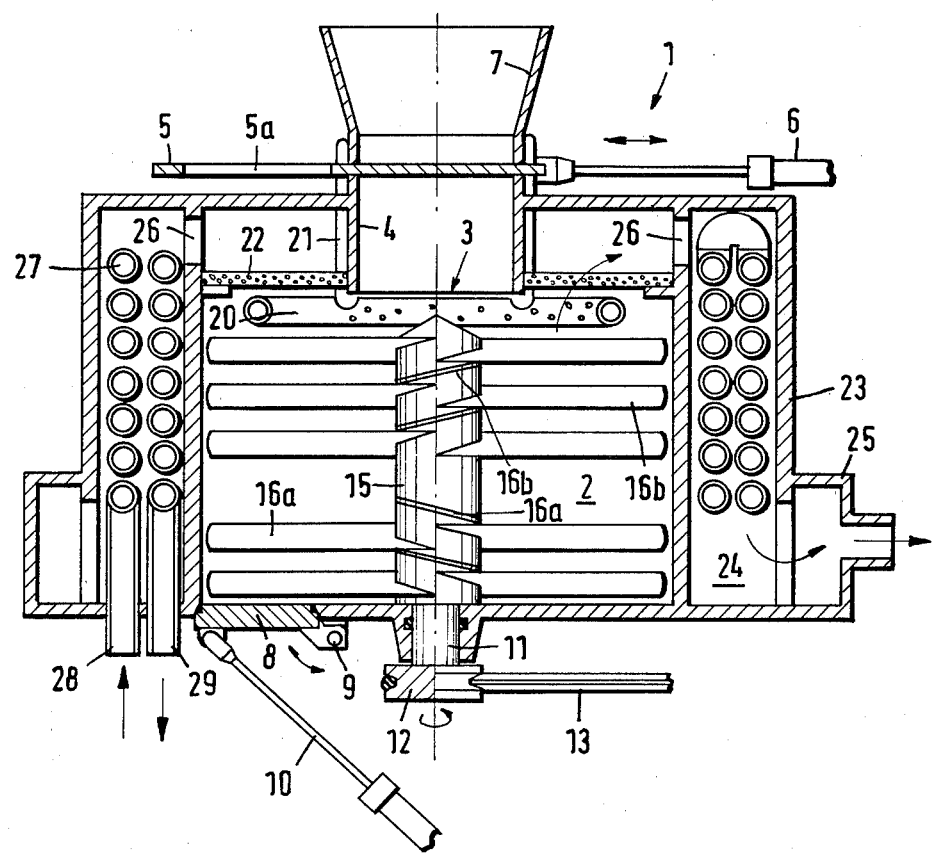

METHOD AND APPARATUS FOR PREPARING, MORE PARTICULARLY FOR THE COOLING AND MIXING OF MOULDING SAND

BACKGROUND OF THE INVENTION

1. Field of the Invention

The invention relates to a method and to apparatus for the preparation, more particularly for the cooling and mixing of moulding sand, in which said method and apparatus the used sand, obtained from the sand batch is cooled, is cleaned where appropriate, and is mixed with other substances by the addition of water and is homogenized accompanied by intensive agitation and the sand particle surface is at least partially covered with a binding agent.

2. Description of the Prior Art

The purpose of preparing sand in the production of casing moulds is mainly to establish the correct mixing ratio of particle sizes and the ratio of proportions of quartz sand, binder, coal dust as well as old and fresh sand, to homogenize the mixture while covering the particles substantially with binder, to adjust the correct moisture content, to remove unusable constituents, such as sand lumps, iron, dust, to adjust the correct sand temperature and to convey the sand to the places of use. The reused proportion of used sand obtained from the sand batch can amount to 80% and more. Since the sand is obtained from the sand batch at elevated temperatures, for example of 100° C. to 140° C., it is necessary for the used sand to be cooled before being filled into the mixing device. Cooling to temperatures between 35° C. and 45° C. is frequently regarded as adequate. As a rule, the sand is cooled by means of moisture and large quantities of air, blown through the sand, so that the evaporation coldness can be utilized for cooling purposes. The quantities of air required to this end are exceptionally large. In a processing plant adapted to process approximately 80 tons of sand per hour requires air at the rate of several hundred thousand cubic meters per hour and an energy input of up to 160 kwh and more. Apparatus required for cooling the sand occupies a correspondingly large amount of space.

The cooled sand is transferred together with other substances, more particularly fresh sand and binder, into a mixing device. This is usually a batch mixer. Mixing and homogenizing can be performed by means of pug mills with rotating kneading rolls which perform a kneading action on the sand in addition to a mixing action. However, it is more common to employ mixing devices with a mixing vessel containing at the bottom thereof a rotating agitating vane which conveys the material continuously in the radial direction outwardly and upwardly at an angle and additionally contains two or more than two rotating agitating units which extend to a position close above the top edge of the agitating vanes and are adapted to take up and intensively agitate the sand and the constituents. The object of agitation is to homogenize the charge within the shortest possible time, for example 90 seconds, and to cover the surface of the individual sand granules with a binder.

Accurate investigations have shown that complete covering is not achieved. The binder, usually containing clay, takes the form of minute dough-like platelets, which bear only partially on the surface of the sand granules and therefore cover these only partially.

Agitating spiders, extending directly to the agitating vanes which rotate on the bottom and are driven at speeds of 1500 rev/min and more are used to agitate the charge.

SUMMARY OF THE INVENTION

It is the object of the invention to disclose a method by means of which the mixing operation is not only improved but cooling and mixing in their entirety can be rendered less energy consuming and less time consuming.

According to the invention the problem is solved in that the sand and the binder are mixed in vacuum, i.e. in a mixing zone whose pressure is substantially reduced compared with that of the ambient atmosphere.

Advantageously, sand and water are introduced into a mixing zone, which is sealed with respect to the ambient atmosphere, are agitated and a vacuum is produced in the mixing zone and gases and vapours are discharged therefrom.

This method of operation offers substantial advantages. To begin with, it has been shown that the use of this particular method results in moulding sand having substantially less resilience during moulding, which leads to a higher accuracy of form and facilitates stripping. An explanation of this effect is possible that in known methods not only sand, binders and other associated additives are mixed and homogenized with each other in the mixing zone, but air also forms a mixing constituent. Especially in cases of intensive agitation, air in the mixing zone reaches high velocities and can thus impair to a greater extent any direct contact between the binder platelets and the surface of the sand granules. In particular, there is a risk of minute quantities of air being hermetically trapped between the surface of the sand granules and the binder platelets, and such air cannot be forced out even by the high pressures which are used for moulding the sand. Adhesion of a binder film on the surface sand granules and adhesion between sand granules are both impaired. The minute, enclosed quantities of air also increase the elasticity of press-formed sand mouldings.

Another important advantage of the novel method is that a substantial part of the cooling operation can be performed during the actual mixing procedure. This is due to the fact that moisture contained in the sand or introduced therein not only evaporates due to the temperature for the system, but is further vaporized by evacuation of the mixing zone. This results in more heat being taken up and dissipated from the quantity of used sand. By cooling the used sand within the mixing zone it is possible either to dispense entirely with conventional sand cooling devices or to construct these substantially smaller, for example in the form of a precooling device. Moreover, since dissipation of the heat by the novel method is performed with the aid of vapor within an enclosed system, namely the evacuating system, it is possible, by a simple procedure, to recover heat abstracted from the quantity of sand in a useful manner. To this end it is advantageous if the vapors, which are abstracted from the mixing zone, are cooled and condensed against condensation surfaces while the vacuum is advantageously maintained.

It is essential that the vacuum in the mixing zone is adjusted to a value which ensures that the moisture introduced into the sand at the residual pressure and temperature is subjected to the further vaporization mentioned above. A pressure of less than 17 Tor, more particularly approximately 10 Tor, has been found convenient.

Cooling and condensation of the almost gas-free vapor atmosphere is conveniently performed by means of the heat absorbing part of a heat pump which transfers recovered heat to a heat-using circuit.

In a practical embodiment it has been found convenient if the used sand is introduced into the mixing zone at a temperature between 50° and 90° C., more particularly between 55° and 80° C. Given a charge of, for example, 2 tons, the temperature of the sand can be reduced to a value between 30° and 40° C. with a mixing time between 60 and 180 seconds.

In some cases it has been found convenient if the mixture is first agitated after the mixing vessel is filled and thereafter the mixing vessel is evacuated whereupon, after a predetermined mixing time of, for example, 30 seconds, water is introduced into the agitated mixture, more particularly by spraying or mist spraying. In some cases it can also be convenient to initially agitate the used portion of the sand with water and to evacuate the mixing zone and to add the binder only after a pre-defined mixing time has elapsed.

In order to increase the cooling action, accompanied by a further saving of energy and space, it is convenient if one or more pre-cooling zones precede the mixing zone. Each pre-cooling zone can also be charged in batches. To this end it is convenient if the cooling zones are also constructed as zones which are sealed with respect to the exterior atmosphere so that the quantity of heat, which is to be dissipated by means of the added moisture, can be recovered by condensing the moisture on cooling surface, for example by means of a heat pump. Cooling can thus be effected by utilizing the latent heat of vaporization. Conveniently, however, cooling in this case is also effected by vaporization of the moisture, mainly by evacuating the pre-cooling zone while sand and water are agitated and the resulting vapors are discharged and condensed on condenser surfaces while the process of evacuation takes place.

Two pre-cooling zones have been found convenient in a practical embodiment, namely in that sand at a temperature of 120° C. is cooled in the first pre-cooling zone to approximately 80° C. and is then further cooled in a second pre-cooling zone from approximately 80° C. to approximately 55° C.

Advantageously, each of the mixing vessel or precooling vessel together with the associated devices is completely enclosed in a casing forming a vacuum chamber, with the exception of the inlets and outlets which are hermetically sealed with respect to the exterior and are provided for charging and discharging. Conveniently, the vessel is provided with a plurality of large openings distributed in the circumferential direction of the annular vacuum chamber and these apertures can be exposed and closed in controlled manner by valve means. The interior of each vessel is also provided with at least one spraying or mist spraying head for supplying water. The associated valve means, the devices for agitation and the drives can all be disposed within the outer casing, i.e. in vacuum. The outer casing has a sufficiently large volume so that it is possible to generate within the interior of the vessel the desired vacuum which is adequate to evaporate the moisture within the desired time when the connecting apertures are exposed in controlled manner. Conveniently, the cooled condensing surfaces for precipitating the moisture are also disposed within the casing. The associated cooling device, more particularly a heat pump, can be disposed outside the casing. The vacuum required within the vacuum chamber can be adjusted by an attached vacuum device during the time of charging and discharging the vessel. In this case it is immaterial if sand particles are entrained by the resultant flow when the connecting ports between the vacuum chamber and the mixing zone are opened. The entrained sand particles come to rest in the vacuum chamber, are deposited there at the bottom and can readily be discharged by means of a sluice. It is also possible to prevent entrainment of the sand from the mixing chamber into the vacuum chamber by means of filters or chicanes.

The supply of moisture can be controlled substantially more accurately than hitherto by mist spraying or spraying the water into the agitated sand bed in the mixing zone or precooling zone. Moreover, direct mist spraying into the agitated sand bed allows far more rapid contact with the large total surface area of the sand granules, permits the absorption of heat and allows the moisture to evaporate immediately thereafter. It is merely important to ensure that the water is introduced in droplet form so that evaporation of the water prior to contact with the sand surface is suppressed as far as possible.

If the used sand is not precooled in vacuum, the air which absorbs the moisture is maintained in circulation in a closed circuit and the cooling and condensing surfaces of a cooling device, more particularly of a heat pump, are disposed in the air circulating circuit.

This not merely assists and improves covering of the sand granules with binders but a very compact construction is thus combined with a substantial saving of energy.

The precooling and mixing zone can also be disposed in the same vacuum casing so that the cooling and condensing surfaces disposed therein serve to condense the moisture from both zones.

It is also possible to associated pressure sluices with the charging and discharging ports of the precooling and mixing vessels so that the interior of the vessel can constantly remain under vacuum. In this case, the vacuum chamber can be in constant free flow communication with the interior of the vessel.

The term "vacuum" in this context refers to an air pressure which is distinctly lower than the ambient air pressure and does not refer to an atmosphere which is also free of vapors.

BRIEF DESCRIPTION OF THE DRAWING

The single drawing shows one vertical section through the apparatus according to the invention.

DESCRIPTION OF THE PREFERRED EMBODIMENT

The novel apparatus 1 comprises a mixing chamber, having a filler port 3 in its upper region, namely at the botton end of a filler duct 4 which is associated with a valve 5 and aperture 5a which can be actuated by means of a thrust jack 6. In the illustration, the valve is shown in the closed position. Above the valve, the charging duct 4 flares in the form of a charging hopper 7.

The mixing chamber 2 is closed at the bottom but has a bottom aperture through which the contents can be discharged. The bottom aperture is associated with a closure 8, which is pivotably supported at 9 and can be moved in the closed or open position by the actuating means 10.

In the center of the mixing chamber 2 there is supported a mixer shaft 15 with a trunnion 11, extending outwardly through a bottom hub and supporting a belt pulley 12 with a driving belt 13. The mixer shaft is provided with mixer tools. The particular function of such tools is to maintain the material charged into the chamber 2 in constant turbulent agitation in order to constantly expose the largest possible surface area of the material particles and at the same time to act powerfully on the material.

To this end, vanes 16a, 16b, are disposed on the shaft 15 and are subdivided into two vane groups in which the vane blades have opposite pitch. The arrangement is such that the bottom set of vanes 16a takes up the material from the region of the bottom and throws it towards the top while the top set of vanes 16b collects the thrown material and accelerates it both in the circumferential direction as well as into the opposite downward direction. This results in intensive agitation of the material within the mixing chamber 2.

A device, which concentrically surrounds the charging aperture 3 and is intended to supply moisture in the form of vapor or water or to supply other liquid additives, is arranged above the mixer shaft 15. An annular tube 20 with a plurality of small exit ports is provided to this end, and the annular tube can be connected by means of pipelines 21 to a corresponding moisture source, where appropriate via controllable valves.

The actual mixing chamber 2 is closed at the top by a filter plate, for example, a sintered metal plate 22 which retains some of the particles in the chamber 2 but allows vapor and air to pass through substantially without obstruction. When required, the sintered plate can be associated with a pneumatic or mechanical cleaning device. Cleaning of the sintered plate at intervals in time can be performed, for example by means of a compressed air surge which is oriented towards the chamber 2.

The mixing chamber 2 is surrounded by a concentric annular chamber 24, closed on its outside by means of a casing 23. The annular chamber 24 communicates with the mixing chamber 2 by means of ports 26 and is in flow communication with the head room which is provided above the sintered plate 22. A connecting socket for connecting the annular chamber 24 to a source of low pressure of vacuum is provided at 25.

Cooling coils 27 are arranged within the annular chamber 24, for example on the heat absorbing side of a heat pump. The cooling coils are connected via outwardly extending sockets 28, 29 to the coolant circuit of a cooling device, more particularly of the heat pump. A discharging device, not shown, disposed at the bottom of the annular chamber 24 permits liquid accumulated in the annular chamber 24 to be sluiced out or discharged.

On being taken into operation, the mixing chamber 2 is filled with the hot material mixture through the filling hopper 7 while the valve 5 is opened. Thereafter, the valve 5 is closed, substantially hermetically. The filled-in constituents can then initially be mixed with each other, substantially in their dry state. After the mixing chamber 2 is hermetically closed, it is advantageously subjected to a vacuum via the annular chamber 24 so that air is substantially withdrawn from the mixing chamber 2 and removed more or less suddenly from the quantity of material filled in the chamber. Dry mixing of the amount of material takes place in vacuum so that any binder can bear in the form of a shell or film uniformly and without interference on the exposed sand granule surfaces.

When the desired state of mixing is obtained or even at the commencement of mixing, the required quantity of moisture is supplied to the quantity of sand by means of the annular distributor 20. Moistening is performed exceptionally rapidly and uniformly because the moisture is applied through nozzles into the agitated sand mass. Vapour produced by impact with the sand granules is continuously and rapidly discharged from the mixing chamber 2 and passes by the cooling coils 27. Liquid is condensed within the vacuum which also prevails in the annular chamber 24, and said liquid is collected at the bottom of the annular chamber 24. In this way, the filled-in amount of material is rapidly and reliably cooled to the required temperature value.

We claim:

1. Method for the cooling and mixing of moulding sand, in which said method used sand, obtained from a sand batch is cooled and is mixed with other substances by the addition of water and is homogenized accompanied by intensive agitation and the sand particle surface is at least partially covered with a binding agent, characterised in that the sand granule surface is covered with binder under vacuum.

2. Method according to claim 1, characterised in that the sand and other mixing substances are introduced into a mixing zone which is sealed with respect to the external atmosphere and are agitated, a vacuum is generated in the mixing zone and gases and vapors are discharged from the mixing zone.

3. Method according to claim 1, characterized in that the used sand is introduced into the mixing zone at an elevated temperature, the pressure in the mixing zone is reduced at least to an evaporation pressure which depends on the prevailing sand temperature and thereafter a quantity of water is introduced into the mixing zone so that a predefined quantity of heat is discharged from the sand together with the vapor.

4. Method according to claim 1, characterised in that initially the used sand and the binder are mixed in vacuum and water is introduced by mist spraying, into the mixture which is maintained in its agitated state.

5. Method according to claim 1, characterised in that the vapor discharged from the mixing zone is cooled to the condensation temperature or below.

6. Method according to claim 5, characterised in that the vapor is condensed in vacuum.

7. Method according to claim 5, characterised in that the vapor discharged from the mixing zone is conducted against condenser surfaces of the heat absorbing side of a heat pump.

8. Method according to claim 1, characterised in that the used sand, containing the heat due to the casting process, is initially agitated with water in a precooling zone and is precooled to a temperature between 50° C. and 90° C. by withdrawal of the gases and of the vapors and thereafter is further cooled in the mixing zone to a temperature which is 20° C. and 40° C.

9. Method according to claim 8, characterised in that the precooling zone is sealed with respect to the ambient atmosphere and at least one of the gas and vapor atmosphere from the precooling zone is conducted in an enclosed flow into a cold and condensing zone.

10. Method according to claim 8, characterised in that the precooling zone and condensing zone are evacuated while sand and water is agitated.

11. Apparatus for performing the method according to claim 1 with at least one cooling station and one mixing station in which the said mixing zone is associated with a vessel for receiving and with apparatus for supplying the constituents to be mixed, with an agitating device and a device for supplying water and a device for removing the finished mixture, characterised in that the vessel can be hermetically sealed or is disposed in a hermetically sealable casing, that a vacuum chamber, provided with apparatus for generating a vacuum and at least one flow connection, which can be closed by a controllable valve device, is provided between the vessel and the vacuum chamber.

12. Apparatus according to claim 11, characterised in that the vessel and the associated devices are disposed substantially completely within the vacuum chamber, with the exception of hermetically closable charging and discharging ports.

13. Apparatus according to claim 11, characterised in that a condensing device, more particularly a condenser associated with the cooled side of a vacuum pump, is disposed in the vacuum chamber.

14. Apparatus according to claim 11, characterised in that the water supply device comprises at least one spraying head which is disposed within the vessel.

15. Apparatus according to claim 11, characterised in that the device for supplying used sand can be charged with sand derived from a preceding casting operation.

16. Apparatus according to claim 15, characterised in that the device for supplying used sand can be charged from a precooling device.

17. Apparatus according to claim 16, characterised in that the precooling device comprises a precooling vessel, which can be sealed with respect to the external atmosphere and is intended for the used sand which is hot from the preceding casting operation, an agitating device, a device for supplying, more particularly for mist spraying, of water and a closed device for extracting hot and moist gases and vapors.

18. Apparatus according to claim 17, characterised in that the extraction device comprises a vacuum chamber which is provided with a vacuum device and contains a cooling and condensing device as well as a suction port which extends to the precooling vessel and can be closed by valves.

19. Apparatus for mixing and cooling foundry sand comprising a mixing and cooling vessel, means for charging material to be mixed into the mixing and cooling vessel, a vacuum chamber surrounding the mixing and cooling vessel and in communication therewith, means for hermetically sealing the mixing and cooling vessel, means for drawing a vacuum in the vacuum chamber and in the hermetically sealed mixing and cooling vessel and means within the mixing and cooling vessel for supplying cooling water to foundry sand therein and for mixing the foundry sand therein.

20. Apparatus as set forth in claim 19, wherein the means for mixing the foundry sand in the mixing and cooling vessel comprises a rotatable shaft extending within the mixing and cooling vessel having upper and lower sets of vanes thereon, slanted in different directions for alternately moving the sand in the mixing and cooling vessel upwardly and outwardly circumferentially of the vessel and downwardly and outwardly circumferentially of the vessel.

21. Apparatus as set forth in claim 20 and further including a porous filter between the mixing and cooling vessel and the vacuum chamber.

22. Apparatus as set forth in claim 21 and further including heat pump condenser coils in the vacuum chamber.

* * * * *